United States Patent [19]
Deen et al.

[11] Patent Number: 5,838,325
[45] Date of Patent: *Nov. 17, 1998

[54] STAR SYMBOL INTERFACE FOR A COPYING/PRINTING APPARATUS

[75] Inventors: Jurek Nikolaj Deen; Eduardus Josephus Willibrordus Van Vliembergen; Henricus Robertus Leo Nicholaas Schliekelmann, all of Venlo; Petrus Cornelus Adrianus Vogels, Eindhoven, all of Netherlands

[73] Assignee: Oce-Nederland B.V., Ma Venlo, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 602,092

[22] Filed: Feb. 15, 1996

[30]     Foreign Application Priority Data

Feb. 15, 1995 [NL] Netherlands ........................... 9500280

[51] Int. Cl.$^6$ ..................................................... G06F 3/00
[52] U.S. Cl. .......................................... 345/353; 395/102
[58] Field of Search .................................... 395/326–358, 395/139, 102; 345/127–131, 146, 326–358, 439; 382/298–301

[56]     References Cited

U.S. PATENT DOCUMENTS

| | | | |
|---|---|---|---|
| 4,627,707 | 12/1986 | Tani et al. | 355/14 R |
| 4,799,081 | 1/1989 | Kikuno et al. | 355/14 C |
| 4,896,291 | 1/1990 | Gest et al. | 395/352 |
| 5,051,927 | 9/1991 | Tada et al. | 395/139 |
| 5,185,628 | 2/1993 | Wilson et al. | 355/209 |
| 5,202,726 | 4/1993 | McCulley et al. | 355/206 |
| 5,588,098 | 12/1996 | Chen et al. | 395/139 X |

FOREIGN PATENT DOCUMENTS 660194 12/1993 European Pat. Off. ....... G03G 15/00

OTHER PUBLICATIONS

"Display and Edit of Job Names Stored on a Memory Card", K. Bunker, *Xerox Disclosure Journal,* vol. 20, No. 1, Jan./Feb. 1995.

"Direct–Select Vacuum Fluorescent For Copier Application", J. Richar, *Xerox Disclosure Journal,* vol. 9, No. 4, Jul./Aug. 1984.

*Patent Abstracts of Japan,* vol. 7, No. 90, p. 191, Apr. 14, 1983 regarding Kokai JP–A–58–016255, Jan. 29, 1983.

"Image Processing for Document Reproduction", P. Stucki, *Advances In Digital Image Processing,* 1980, pp. 177–218.

*Primary Examiner*—John E. Breene

[57]     ABSTRACT

A reproducing device for reproducing images, such as a photocopier/printer, which has an interface that enables selection of a value for at least one predetermined parameter from among a predetermined set of possible values of the parameter. This parameter defines at least in part how at least one image is to be reproduced. The reproducing device includes: an image source, such as a scanner; a printer; the interface; and a controller for coordinating and controlling the image source, the printer, and the interface. The interface includes: a manipulation device, physically configured to be manipulable in ways corresponding to a plurality of intersecting lines, respectively, for converting manipulation into a signal that identifies one of two possible directions of a line; a memory for storing a plurality of sets of possible values for each of at least one predetermined parameter, each set corresponding to one of the lines; and a parameter-value device for enabling stepwise selection of a value, within a set of possible values of the parameter, in response to the way in which the manipulation device is manipulated as indicated by the signal from the manipulation device. The plurality of sets for a predetermined value, for example, can include: a first set that is all possible values of the parameter; and a second set that is a subset of the first set corresponding to preferred values.

38 Claims, 11 Drawing Sheets

STAR SYMBOL INTERFACE FOR A COPYING/PRINTING APPARATUS

BACKGROUND

1. Technical Field of the Invention

The invention relates to apparatus for reproducing images on an image support, comprising a feed unit for image information; a printing unit for printing an image on an image support in accordance with the image information supplied; an operating unit provided with operating means for setting parameters which determine the method of printing the said image; and a control unit connected to the operating means for controlling the apparatus in accordance with the set parameters.

2. Description of Related Art

Apparatus of this kind, such as copying machines or printers, are generally known.

A parameter which has to be set by an operator prior to a copying process is the enlargement scale, for example. Many known copying machines are equipped with a continuously variable enlargement scale. The enlargement (or reduction which is considered as an enlargement having a factor less than 100%) can then be set to an arbitrary value within the range determined by the technical construction of the apparatus, e.g. in steps of 1%.

In practice, certain values within that range are used more frequently than others. This applies to the enlargement factors corresponding to imaging of standard paper formats, such as the A-series, on one another. For example, to image an A-4 format on an A-3 format an enlargement with a factor of 141% is required and on an A-5 format an enlargement with a factor of 71%.

Known apparatus of this kind are frequently provided with operating means, usually keys, for continuously varying the enlargement scale. The operating panel also has keys elsewhere for the selection of the formats of the original document and the copy support material which, whether or not in combination with an optional "automatic enlargement", immediately set one of the enlargement factors for imaging the standard paper formats on one another. However, it is far from always desirable that selection of one of these special enlargement scales should be coupled to the choice of copy support material.

SUMMARY OF INVENTION

It is therefore desirable to give the operator an option for selection of the value of a parameter such as the enlargement scale, which on the one hand enables rapid selection of a limited group of preferred values and, on the other hand, offers for selection a more extensive group of values, in a simple and readily apparent manner.

To this end, according to the invention, the operating means comprise a directional operating element, said element by nature being adapted to operation in an even number of directions greater than two, such directions being opposed in pairs, for the purpose of selecting, for a predetermined parameter, a value from a set of possible values, in such manner that to each pair of opposite directions of the said operating element is allocated a sub-set of the said set of possible values, said sub-set differing from the sub-sets allocated to another pair of opposite directions of the operating element and that operation of the said operating element in accordance with any pair of opposed directions enables stepwise selection from the sub-set allocated to said pair of directions.

In other words, the objects of the present invention are fulfilled by providing an interface in an apparatus for reproducing images, the interface enabling selection of a value for at least one predetermined parameter from among a predetermined set of possible values of the parameter, the parameter defining at least in part how at least one image is to be reproduced, the interface comprising: manipulation means, physically configured to be manipulable in ways corresponding to a plurality of intersecting lines, respectively, for converting manipulation into a signal that identifies one of two possible directions of a line; a memory for storing a plurality of sets of possible values for each of at least one predetermined parameter, each set corresponding to one of the lines; and parameter-value means, operatively interconnected to the manipulation means and the memory, for enabling selection of a value within a set of possible values of the parameter in response to the way in which the manipulation means is manipulated as indicated by the signal therefrom.

The objects of the present invention also are fulfilled by providing an apparatus for reproducing images, the apparatus having an interface enabling selection of a value for at least one predetermined parameter from among a predetermined set of possible values of the parameter, the parameter defining at least in part how at least one image is to be reproduced, the apparatus comprising: image generation means for generating at least on image; a printer; an interface enabling selection of a value for at least one predetermined parameter from among a predetermined set of possible values of the parameter; and a controller for coordinating and controlling the image generation means, the printer, and the interface. The interface includes: manipulation means, physically configured to be manipulable in ways corresponding to a plurality of intersecting lines, respectively, for converting manipulation into a signal that identifies one of two possible directions of a line; a memory for storing a plurality of sets of possible values for each of at least one predetermined parameter, each set corresponding to one of the lines; and parameter-value means, operatively interconnected to the manipulation means and the memory, for enabling selection of a value within a set of possible values of the parameter in response to the way in which the manipulation means is manipulated as indicated by the signal therefrom.

By concentrating the access to the various sub-sets of values of the associated parameter in one operating element, selection can be performed rapidly and easily. This appears to be very convenient, in practice, to many users. One would have expected that a user would not have known how to use the manipulation means, for example, embodied as the well-known cursor key set, so as to operate the interface. Yet the opposite is true. Testing has shown that users quickly learn how to use the interface.

Preferably, one of the sub-sets is equal to the complete set of selectable values of the associated parameter.

Another parameter which can be operated with an operating element according to the invention is the number of sub-images in a multiple-up method. In this method, images (usually reduced) of a number of original documents, hereinafter referred to as sub-images, are printed together on one copy support, in order thus to give a survey of all these documents. The sub-images are printed in a regular layout, e.g. 2×2, 3×3, etc, but in practice the number of documents to be printed in this way will often be unequal to the numbers corresponding to said regular layouts.

The invention now offers the operator the possibility of selecting either the actual number of documents, whereupon the control unit automatically establishes the layout in which all the documents can be imaged, possibly together with blank spaces, or directly selecting the number corresponding to the correct or some other required layout. When the actual number of documents does not correspond to the number set by this second method, the operating unit will fill the copy image with blank spaces. Different directions of the operating element are used for these different selection methods.

The invention also comprises a printing apparatus or printer comprising an input unit for digital image information; means for storing a number of digital image data files supplied; a printing unit for printing an image on an image support in accordance with the image information supplied; and an operating unit, provided with operating means and a display screen, for presenting all the stored files to an operator for selection so that a selected file can be printed, a character string being displayed on the said screen for each file.

In this printing apparatus, the operating means comprise a directional operating element, such element being adapted to operation in an even number of directions greater than two, such directions being opposed in pairs, for selecting a character string from the set of character strings corresponding to the stored digital image data files, in such manner that a sub-set of the said set of character strings is allocated to each pair of opposite directions of the said operating element, said sub-set differing from the sub-sets allocated to another pair of opposite directions of the operating element, and that operation of the said operating element in accordance with any pair of opposed directions enables stepwise selection of the sub-set allocated to said pair of directions.

In one embodiment of this printing apparatus, a first sub-set comprises all the character strings corresponding to the stored files and a second sub-set comprises the alphabetically or numerically first character string of all the character strings of the said set starting with the same character.

Thus an operator can "step" through the set of character strings in long skips by operating the operating element in one direction, and on the other hand traverse the character strings one by one by operating the operating element in the (or an) other direction.

The directional operating element may comprise an even number of keys greater than two disposed in the immediate vicinity of one another and opposite one another in pairs, or an even number of fields greater than two disposed in the immediate vicinity of one another and opposite one another in pairs on a touch-sensitive display screen. Such sets of keys are known from PC technology to control a cursor on the screen.

The directional operating element may alternatively comprise a joystick, mouse or track ball (a ball projecting partially from the operating panel and operated by a sweeping movement of the hand). Since an operating element of this kind can in principle be operated in an infinite number of directions, an interpretation circuit should be added to it to interpret operation in any direction as being operation in the closest direction belonging to the set of permissible directions. The choice of operating directions could also be limited by mechanical means. Generally, it is possible to use any operating element that can be operated in more than two different directions opposed to one another in pairs.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The invention will now be explained with reference to the exemplified embodiment described hereinafter with reference to the following drawings in which like reference numerals refer to like parts and which are given by way of illustration only and are not limitive of the present invention wherein.

DETAILED DESCRIPTION OF PREFERRED EMBODIMENTS

Figure 1:
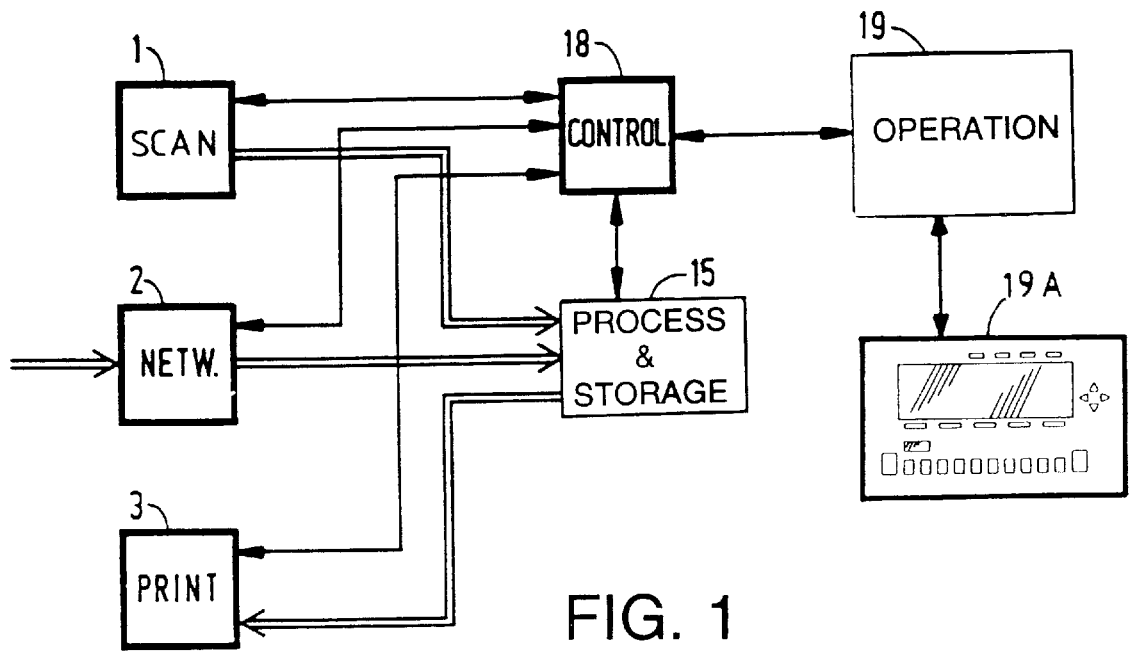
FIG. 1 shows the general layout of an apparatus according to the invention.

FIG. 1 shows the general construction of an image reproduction apparatus according to the invention. The apparatus comprises a scanner 1 for opto-electrical scanning of a document and delivering digital image information corresponding thereto, an input unit 2, e.g., a network interface, for inputting image information from an external source and a printing unit 3, e.g., a printer, for printing digital image information on a support.

Both the scanner 1 and the input unit 2 are connected to a device 15 for processing and intermediate storage of image information, which is in turn connected to the printing unit 3. Scanner 1, input unit 2, device 15 and printing device 3 are connected to a central control unit 18, which is also connected to an operating unit 19 provided with an operating panel 19A with operating elements and a display screen for use by an operator.

Figure 2:
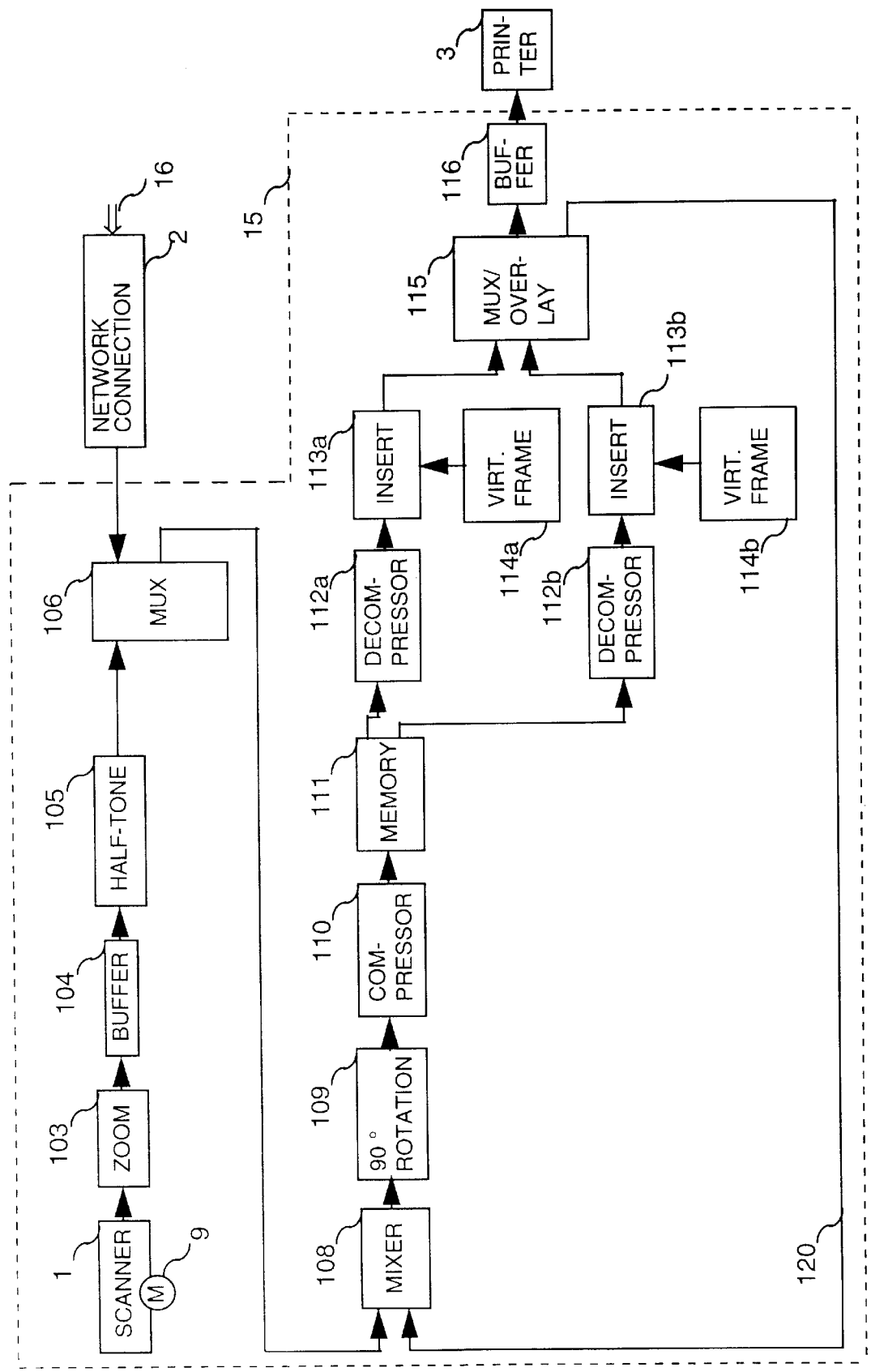
FIG. 2 is a diagram showing the construction of an apparatus for processing and intermediate storage of image information for use in the apparatus of FIG. 1.

FIG. 2 is a diagram showing the construction of a device 15 for processing and intermediate storage of image information, in which the rectangles represent functional modules (both physical components and software modules)

and the arrows indicate the data flow from one module to the next. The scanner 1, input unit 2 and print unit 3 are included in this drawing in order to show their position with respect to the device 15. Although not shown in the drawing, the various elements of the device 15 are connected to the control unit 18, which co-ordinates their action.

The scanner 1 scans an original document line by line and in so doing delivers digital signals which describe the grey values of raster dots (pixels) of the document. The scanner element (CCD array) and the document are moved relatively to one another by means of a motor 9. This may be a servomotor with a feedback circuit for the position of the scanner element. A more detailed description of the scanner will follow.

The digital signals from the scanner are fed to a ZOOM module 103 which, if required, performs enlargement or reduction via interpolation.

The signals from the ZOOM module 103 are fed via a buffer 104 to a half-tone module 105 which converts the signals, which then still describe grey values, into binary signals which specify one of two values for each pixel: 0 or 1, so that these signals become suitable for controlling a printer unit which can print only white or black image dots. The literature describes many half tone processes so that no explanation is required. It is immaterial to this description what half-tone processing is applied provided the resulting signals are binary.

The signals from the half-tone module 105 are in 5 turn transmitted to a multiplexer 106. An input unit 2 for digital image signals from a local network 16 is connected to another input of multiplexer 106 so that digital signals can be fed from an external source, such as a work station. The multiplexer 106 passes one of the two data streams (from the scanner or from the network) to a mixer (or overlay) module 108. The latter has a second input to which a return line 120 is connected for the feedback of signals from the memory 111, which will be discussed hereinafter.

The signals from multiplexer 106 and the return line 120 can be mixed in the mixer module 108 in accordance with logic functions on a pixel basis, corresponding to the mixing of two images. Examples of such logic functions are: OR, AND, EXOR. Mixing of binary image signals in this way is generally known from the literature and requires no further explanation here.

The mixer module 108 is connected to a rotation module 109, in which the image defined by the signals from the mixer module 108 can be rotated through an angle of 90°.

The signals from rotation module 109 are then compressed in a compression module 110 and stored in a memory 111. Although compression is not absolutely essential, it is recommended, because in this way it is possible to store the data of more documents. The compression method may, for example, be run length coding. The memory 111 is provided with a management system (not shown), which updates the addresses on which the data of the documents are stored.

The memory 111 is constructed with two independent read-out lines, so that the image data of two documents can be read out simultaneously. These read-out lines are each connected to a decompression module (112*a*, 112*b*). These are connected to processing circuits, which are identical in principle and which are formed by insert modules 113*a*, 113*b*. These modules can combine the image signals with artificial image data corresponding to a blank (white) image and which are delivered by a virtual frame module 114*a*, 114*b*, also connected to insert module 113*a*, 113*b*. The objective of this is to be able to make image data which describe a larger image than the image data from the memory 111, e.g. an image the right-hand half of which consists of a scanned document and the left-hand half of which is blank (white).

The insert modules 113*a*, 113*b* are connected to a mixer (or overlayer) and multiplexer 115, in which one of the image signals can be selectively transmitted or both image signals can be mixed, in the same way as described for the mixer module 108.

The mixer multiplexer 115 has two outputs. One is the return line 120 already mentioned, which enables images stored in the memory to be mixed with newly supplied (scanned) images. The other output is connected via a buffer 116 to the printing unit 3, which will be discussed in greater detail hereinafter.

Figure 3:
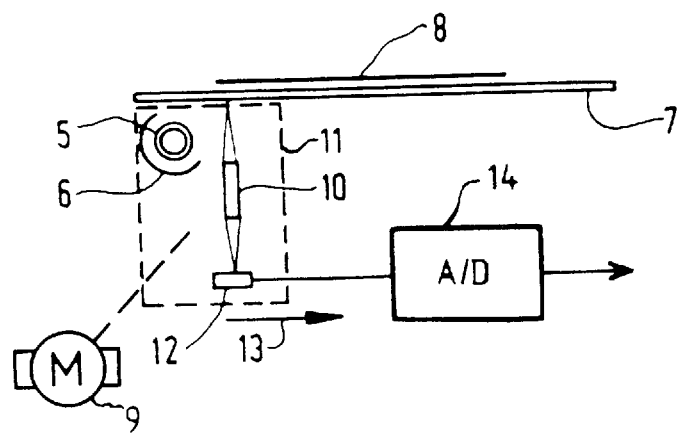
FIG. 3 shows a scanner for use in the apparatus of FIG. 1.

Buffers may be provided at various locations in the circuit described. Because, however, these are not relevant to the principle of operation, they have not been included in the description. The scanner device 1 is shown in greater detail in FIG. 3. It is provided with a tubular lamp 5 and a reflector 6 co-operating therewith, by means of which a narrow strip of a document 8 on a glass platen 7 is illuminated. The scanner also comprises an array 10 of imaging glass fibers (a "selfloc-lens-array") by which the light reflected by the document is projected on a sensor array, e.g., a CCD array 12. The lamp 5, reflector 6, selfloc-lens-array 10 and CCD array 12 are combined on a carriage 11 which, during scanning, is advanced by a servomotor 9 at a uniform speed in the direction of arrow 13 so that the document 8 is scanned line by line by the CCD array 12. The position of the carriage 11 is continuously measured in a known way and is used, inter alia, for the feedback circuit of the servomotor 9.

Thus each image dot of the document is converted to an analog signal corresponding to the grey value of that image dot. The analog signal is then converted to a digital signal for each image dot by means of an A/D converter 14.

The scanner device 1 can also be provided with an automatic or semi-automatic document feeder (not shown in the drawings). An automatic document feeder (ADF) comprises a tray for receiving a stack of documents for copying, a separating mechanism for removing the documents from the stack one by one, and a conveyor mechanism for conveying a detached document to the glass platen 7.

A semi-automatic or manual document feeder (MDF) comprises a conveyor mechanism whereby manually inserted documents are fed to the glass platen 7. The feed units referred to are generally known so that no detailed description is necessary.

Figure 4:
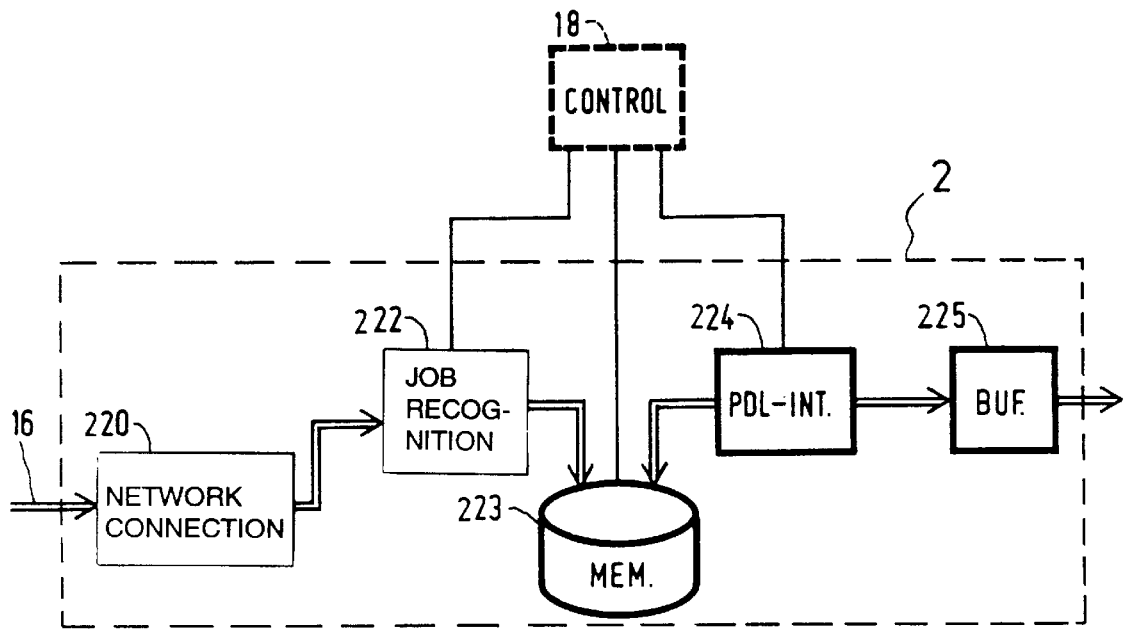
FIG. 4 shows the construction of a front-end for use in the apparatus of FIG. 1.

The input unit 2 for digital image information from an external source, or a front-end, is shown in FIG. 4. This unit is provided with a network connection unit 220 connected to an external network 16, to which, for example, a number of workstations can be coupled. These workstations can send data files in various generally used formats (page description languages such as PCL, PostScript and so on) via network 16 to have them printed. The technique of networks and the transmission of data files thereover is generally known and will therefore not be explained here.

The connection unit 220 is connected to a job recognition module 222 which is in turn connected to a hard disc 223. The job recognition module 222 detects the page description language (PDL) used in each data file supplied and extracts identification data contained therein. In network systems, data files for transmission are always provided with identification data. These data usually contain the name of the sender (owner) of the file and the name of the file itself. These data are extracted by the job recognition module 222.

The hard disc 223, which is intended for interim storage of a data file supplied, is also connected to a PDL interpreter 224 for converting a data file coded in a page description language into a form suitable for processing by the printing unit 3, this process generally being known as "rasterizing". The PDL interpreter 224 is connected via a buffer 225 to the processing and interim storage device 15. The job recognition module 222, the memory disc 223 and the PDL interpreter 224 are also connected to the control unit 18.

Figure 5:
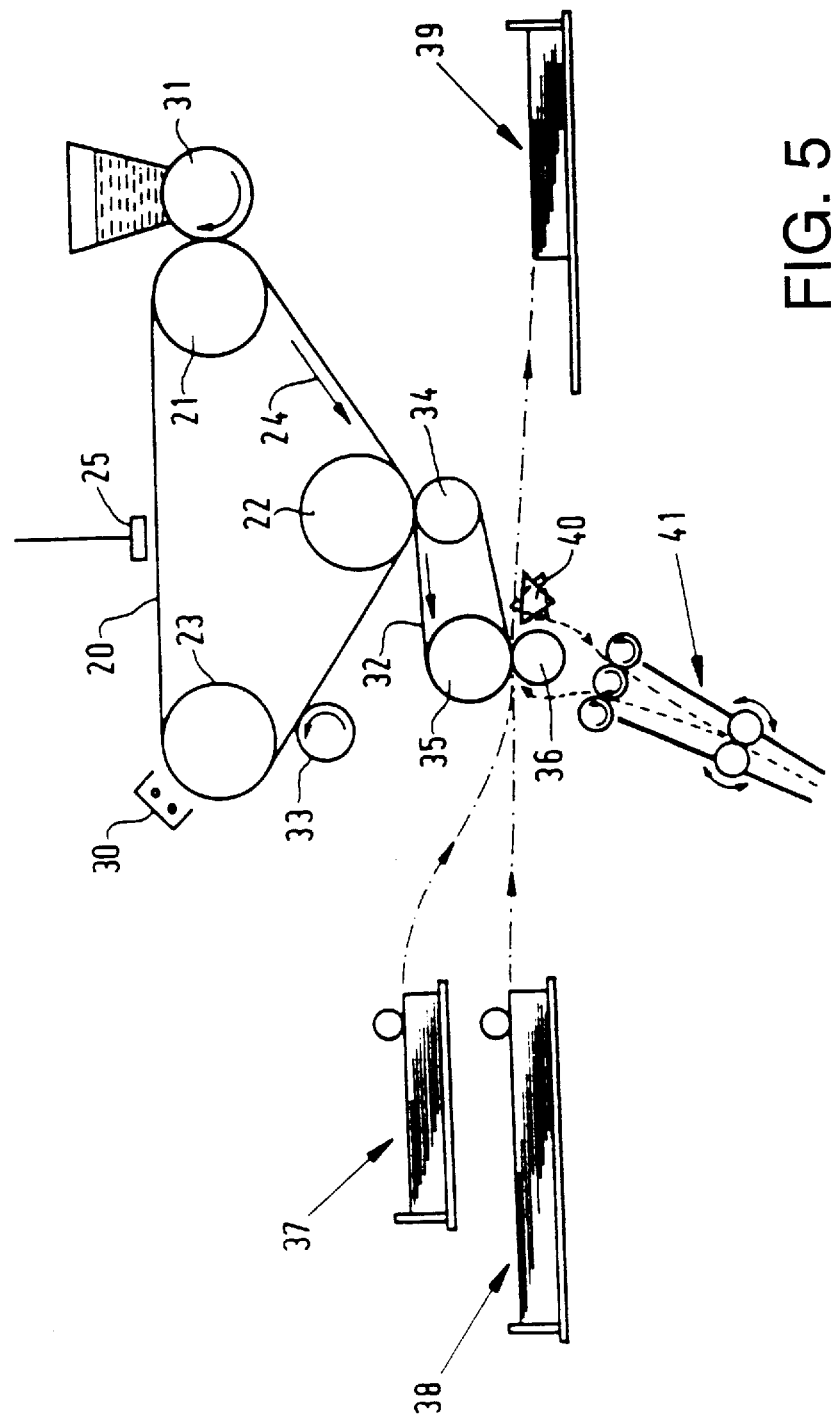
FIG. 5 shows the construction of a printing unit for use in the apparatus of FIG. 1.

For a description of the printing unit reference is made to FIG. 5. This printing device is provided with an endless photoconductive belt 20 which is advanced by driving or guide rollers 21, 22 and 23 at a uniform speed in the direction of arrow 24.

By way of the processed image data supplied from device 15 an LED array 25 is so triggered that the photoconductive belt 20 is exposed image-wise line by line after being electrostatically charged by a corona device 30.

The latent charge image formed on the belt 20 by the exposure is developed with toner powder by a magnetic brush device 31 to give a toner image which in a first transfer zone is then brought into contact under pressure with an endless intermediate belt 32 made from or covered with an elastic and heat-resistant material, e.g. silicone rubber. In these conditions the toner image is transferred by adhesive forces from the belt 20 to the belt 32. After this image transfer, any toner powder residues remaining are removed from the photoconductive belt 20 by means of a cleaning device 33, whereupon the belt 20 is ready for fresh use.

The intermediate belt 32 is trained over drive and guide rollers 34, 35, the said belt 32 being heated to a temperature above the softening temperature of the toner powder, e.g. by means of an infrared radiator disposed inside roller 35. While the belt 32 with the toner image thereon is advanced, the toner image becomes tacky as a result of the heating.

In a second transfer zone between the belt 32 and a pressure roller 36, the tacky toner image is transferred by pressure and simultaneously fixed on a copy sheet fed from one of the reservoirs 37 or 38.

The copy obtained in this way can be finally deposited in a tray 39 or be fed by a deflector element 40 (in the position shown in broken lines) to a turn-over device 41 in which the copy sheet is turned over and then re-fed to the second transfer zone between the belt 32 and the pressure roller 36 in order to be printed on the other side in said transfer zone with a powder image and then placed in the tray 39.

FIG. 5 shows only two copy sheet reservoirs 37 and 38 but of course the number of reservoirs can be extended to accommodate different sizes of copy sheets (formats such as A5, A4 and A3, and also others, e.g., American formats). In addition, it is also necessary to be able to present the different copy sheet formats in different orientations-namely landscape (the longest peripheral side in the direction of transit) or portrait (the shortest peripheral side in the direction of transit) in order that copies of one and the same copy sheet format can be made with the orientation of the image information extending optionally in the direction of transit of the copy sheets through the printing device or perpendicularly thereto.

The different components of the printing device 3 are controlled by the central control unit 18, directly or through the agency of sub-control modules.

Figure 6:
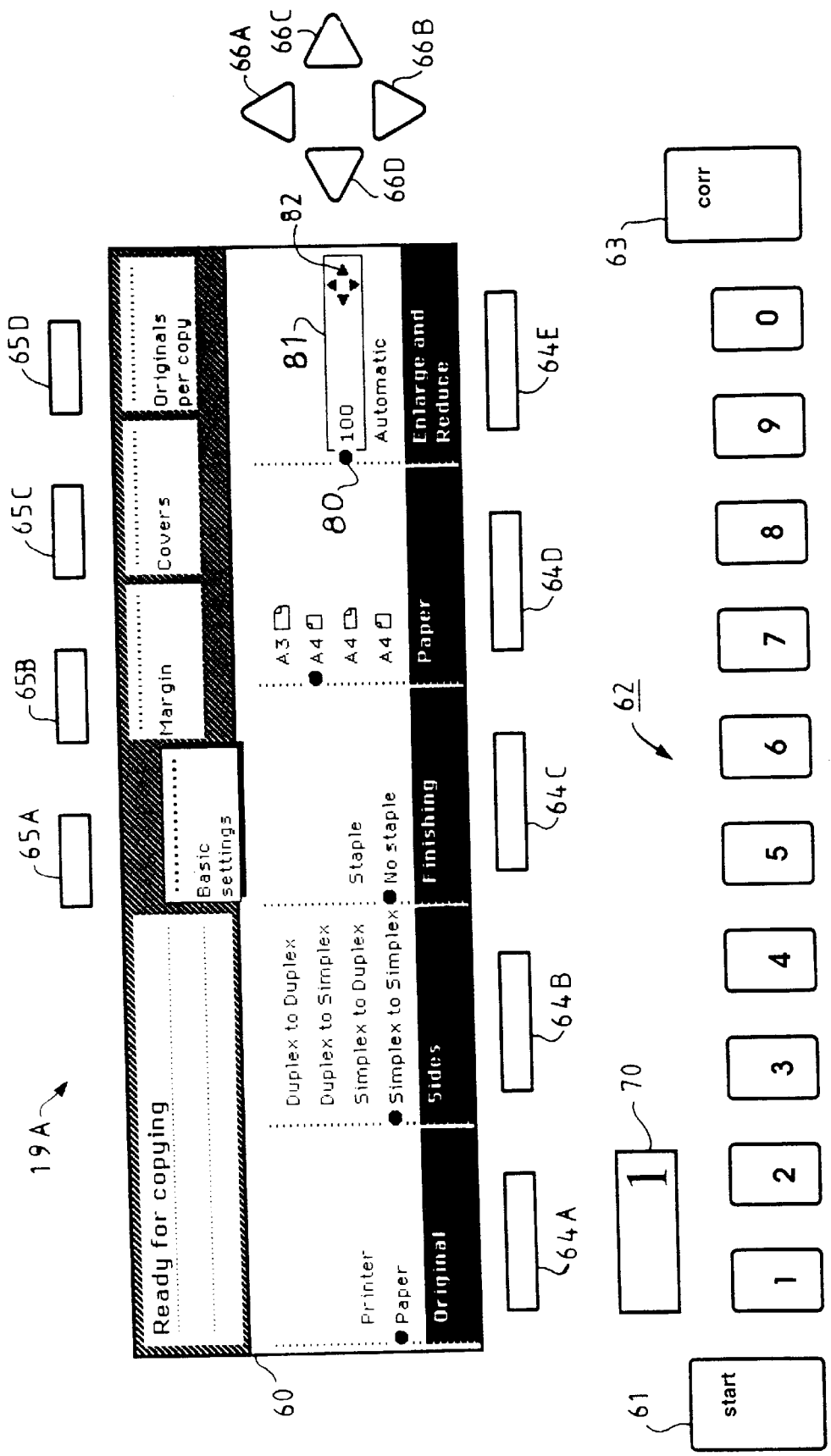
FIG. 6 shows an operating panel for use in the apparatus of FIG. 1.

The operating panel 19A is shown in FIG. 6 and comprises a display screen 60, such as an LCD display, and a number of keys (in the form of a touchscreen and/or discrete switches), namely a start key 61, numeral keys 62, a correction key 63 and selection keys 64A–E, 65A–D and the key star cluster 66A–D. The latter comprises the keys 66A (at the top), 66B (at the bottom), 66C (on the right) and 66D (on the left). All these elements are connected to the operating unit 19, which in response to operation of the keys passes signals to the control unit 18 and which also controls the display screen 60 to show selection options and messages to the operator.

When the apparatus is switched on, the display screen 60 displays an image formed by a number of vertical columns each situated above one of the selection keys 64A–E. Each column relates to a specific basic function of the apparatus and shows the different possible settings of said basic function. For example, the column furthest on the left is allocated to the selection between the copying function, in which a document is scanned by the scanner and then reproduced, and the printer function, in which a print is made in accordance with digital image data supplied via the network connection. The setting selected at any time, in this case the copying function, is denoted by a marker such as a dark spot or by highlighting.

By operating a selection key an operator can select a different setting, e.g. in accordance with a cyclic pattern. As a consequence of changing a setting, the function of one or more of the other selection keys may change, because the old function is no longer relevant and other options are required. Different text applicable to the new function then appears in the associated column on the display screen 60.

The selection keys 65A–D offer the option of calling up a different set of functions (section), which cannot be displayed owing to the restricted dimensions of the display screen 60. Generally these are functions which are not required for a simple copying or printing order but which offer the operator more options to obtain special printing results. In this example, these functions include shifting the margin on the print, adding covers, and multiple-up (which will be described in detail below). The meaning of the keys 65A–D is shown in an associated field on the display screen 60 directly beneath each key. When one of the keys is actuated, a corresponding set of functions is activated and the make-up of the display screen 60 is adapted to the associated functions. At the same time, this selection is illustrated by framing or otherwise emphasizing the field on the display screen 60 associated with the actuated key from the group 65A–D.

The columns above the keys 64A (already referred to), 65B (single-side or double-side, both with respect to the original document and to copy sheets), 64C (stapling) and 64D (the choice of printing paper format), relate to the finishing of the job.

The operating panel 19 also contains a numerical display 70 to show the number of prints set, as is conventional on copy sheets.

Individual functions of the apparatus will now be discussed.

Enlargement Function

With the apparatus described here, it is possible to make enlarged or reduced copies of a document. Enlargement or reduction of an image is effected by changing the resolution of the raster pattern of pixels with which the document is described. Since the printing unit has a fixed resolution, the dimensions of the printed image are determined by the resolution of the digital image data delivered to the printing unit: a higher resolution results in an enlargement of the printed image and a lower resolution results in a reduction thereof.

To change the resolution the apparatus is equipped with ZOOM module 103 (FIG. 2), in which the raster pattern of pixel values can be converted by interpolation into a pattern having larger or smaller resolution. Interpolation algorithms for resolution change are generally known. Instead of interpolation, an enlargement or reduction is possible by simply doubling or skipping scan lines, respectively.

Figure 7:
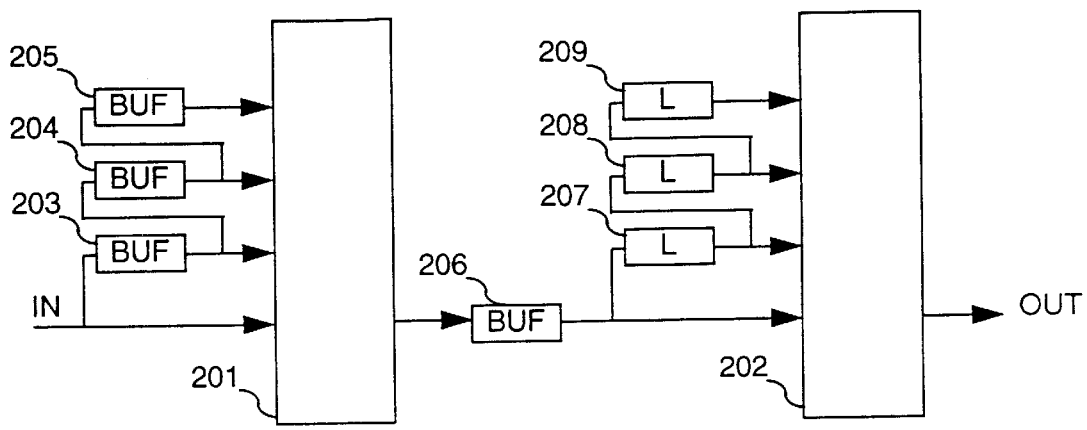
FIG. 7 is a diagram showing the construction of an interpolation circuit for the enlargement of images.

A diagram of the construction of an interpolation circuit for quadratic interpolation in shown in FIG. 7. The algorithm used for this two-dimensional process is based on successive performance of two one-dimensional interpolations. The first interpolations are performed in a direction transversely of the scan lines, and in these conditions interim image lines are calculated which lie on the required positions between the original scan lines. Interpolations are then carried out in each interim image line on the pixels thereof, so that the values of pixels at the required positions are calculated. This process is described in detail in: Stucki, P.: "Image processing for document processing", from: "Advances in digital image processing", Plenum Publ. Corp., 1980, p. 177–216.

The interpolation circuit comprises a first module 201 for the first-mentioned interpolation and a second module 202 for the second interpolation.

For a one-dimensional quadratic interpolation, four pixel values on a line are required, and for this purpose the two modules are adapted to process four pixel values simultaneously. The module 201 has four inputs to which the scanner signals of four successive scan lines are presented by means of three line buffers 203, 204, 205. In this way, the values of the pixels situated at a specific position in the four scan lines are presented simultaneously. From this the module 201 calculates the value of a pixel of the interim image line at the said position. In this way module 201 delivers a stream of pixel values of consecutive interim image lines. Module 201 is connected via a line buffer 206 to the second module 202 which also receives on its other three inputs the three preceding pixel values of each directly presented pixel value via a data stream which is tapped off three times and delayed in latches 207, 208, 209. From these four pixel values module 202 calculates the value of the interpolated pixel. Thus a stream of interpolated pixel values of the enlarged or reduced image appears at the output of module 202.

With arbitrary use of the ZOOM module 103 in the case of resolution enlargement both the number of pixels per scan line and the line frequency, i.e., the number of scan lines per second, are enlarged and this may make difficult any further processing of the image signals, because there is a risk that the bandwidth of the processing modules, such as the half-tone module, will be exceeded. This can be solved by also using the buffer 104, which is already provided to even out any synchronization discrepancies, to delay the data stream.

Alternatively, for enlargement, the scanning speed, i.e., the speed at which the motor 9 moves the scanner carriage 11 (FIG. 3) with respect to the document, can be reduced, while the line frequency (sample frequency) of the scanner is kept constant. As a result, the resolution increase in the direction of transit of the scanner is already reached by the scanner movement itself, while the frequency at which the scan lines are delivered by the scanner remains constant. In that case the ZOOM module is used only for one-dimensional resolution enlargement, i.e. increasing the number of pixels per scan line.

This solution has been chosen for the apparatus described here. The speed of movement of the scanner is adjustable here and is controlled in dependence on the enlargement factor.

For some high enlargement factors, it may happen that the bandwidth of the processing electronics is exceeded, because the number of pixels per scan line is too high. In that case, the line frequency can be reduced if required, so that the-longer-lines are delivered with longer intermediate pauses, so that there is more time for processing them.

This can be done, for example, by additionally reducing the scanning speed and also reducing the line sample frequency of the sensor array. If the latter encounters practical difficulties, the scanning speed can also be additionally reduced while the line sample frequency remains constant. In that case the number of scan lines per length unit in the direction of transit is naturally excessive, but this number is then reduced by the ZOOM module to the correct number of lines which are then delivered with longer intermediate pauses.

In the case of reduction, the complete change of resolution can be carried out by the ZOOM module, because in this case there is no risk of exceeding the bandwidth of the processing electronics. Also, reduction can of course be carried out by increasing the speed of movement of the scanner carriage 11 (FIG. 3) while maintaining the line frequency (sample frequency). In that case the ZOOM module is used only for resolution reduction in the direction of the scan lines (reduction of the number of pixels per line).

In the case of intensive reduction, however, the required speed of movement of the scanner carriage may become impracticably high. To obviate this, a hybrid method can also be used, in which both scanning speed is reduced and the number of lines reduced with the ZOOM module.

A convenient choice is to increase the speed of the scanner solely by half the required value and to use the delivered scan lines simply alternately.

Multiple-Up Function

Figure 8:
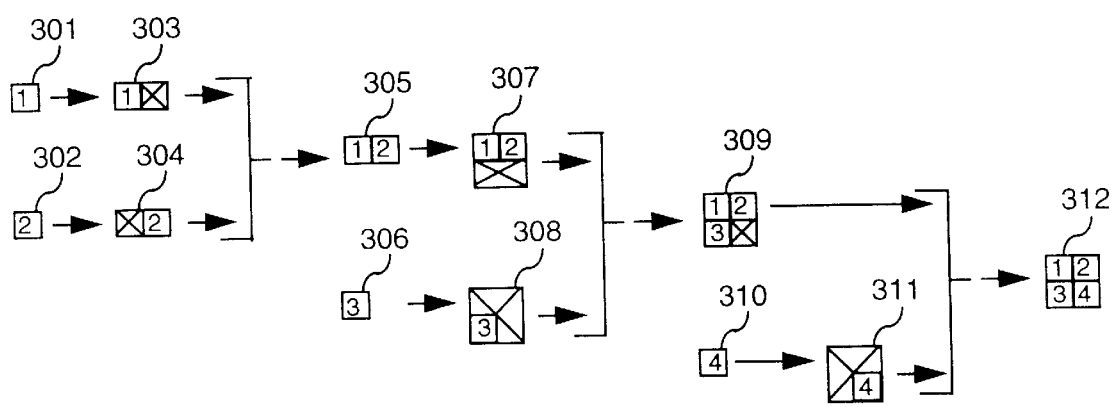
FIG. 8 shows the procedure in making up a multiple-up image.

The apparatus described also has a multiple-up mode (sometimes referred to as a "tiling" mode"), in which a number of documents specified by an operator is printed in reduced form on one copy sheet. The original documents are scanned one by one by the scanner and combined to give a total image by means of the mixer modules 108 and 115, memory 111 and the virtual frame modules 114a, 114b. The combination of a total image of this kind will now be explained by reference to an example of 4-up, in which, therefore, four original documents are printed in a two-by-two arrangement on one copy sheet. Other numbers are carried out similarly. Reference will be made to FIG. 8.

In response to the specification of the number of document images to be compiled, the apparatus control determines the suitable reduction and arrangement of the images, so that these fit in optimum manner on one copy sheet. These data are pre-stored in a table for each possible value of the number of document images desired on the page. The documents are then scanned one by one and the scanned and reduced image, hereinafter referred to as the sub-image, is stored in each case in the memory 111. After the sub-images corresponding to the first two documents (301 and 302 respectively) have been stored, they are each read-out by an output of the memory 111 and combined in insert module 113a, 113b respectively with a rectangular image large enough to contain both (303 and 304 respectively). The "blank" parts of the images 303 and 304 are indicated by a cross.

In these conditions, the first sub-image 301 is placed on the left in the larger image 303 and the second sub-image 302 on the right in the larger image 304. These two larger images 303 and 304 are then mixed in a mixer multiplexer 115 and the result, 305, is again stored in the memory 111 via the return line 120. The third original document is then scanned, reduced, and stored in memory 111 as sub-image 306.

Sub-image 306 is then read out and placed in a larger image 308 large enough to contain the three sub-images 301, 302, 306. At the same time, the combined image 305 of the first and second sub-images is read out and also placed in a larger image 307 of this kind. These larger images 307 and 308 are now in turn mixed in mixer multiplexer 115 and re-written in memory 111 as image 309. The fourth original document is then scanned, reduced, and stored in memory 111 as sub-image 310.

Sub-image 310 is in turn read out and placed in a larger image 311 equal in size to image 309. At the same time, image 309 is read out of memory 111 (this image still contains an empty space). Both images 309 and 311 are then combined in mixer multiplier 115 to form the end image 312. This end image is then transmitted to the printing unit to make a physical print.

The total multiple-up image is built up in this way. Other numbers of documents can be combined into one image in a similar manner. Alternatively, a larger image of a fixed size can be used to start with, of a size sufficient to accommodate all the sub-images.

In an alternative procedure, all the documents are first scanned, reduced, and stored in the memory 111 and then the combination is carried out by adding the sub-images one by one to the total image, in exactly the same way as described above.

A particular form of multiple-up is one in which the sub-images do not relate to different original documents but all reproduce one and the same document. This form is also known as "same-up". The procedure for forming a same-up total image is largely identical to the said alternative procedure for a multiple-up total image, in which first all the documents are scanned, the only difference being that it is always the same sub-image that is used.

The orientation of the copy sheet can be adapted according to the number of documents to be imaged on a copy sheet. Thus a 4-up image will preferably have the same orientation as the original documents (usually "portrait", because most documents have this orientation). With 8-up, however, a "landscape" orientation formed by two 4-up images next to one another is preferable, at least for A-formats, because then the copy sheet can be completely filled. In that case, the sub-images must be rotated through 90°. The rotation module 109 in the diagram of FIG. 2 is then used.

Printer Function

In the apparatus described here, when a data file is fed via a network, a print thereof is not generally made immediately because a command from the operating panel is being awaited.

The procedure in the case of a print job arriving via the network is as follows (referring to FIG. 4). A data file for printing fed by a workstation via the network is passed by the network connection unit 220 to the job recognition module 222. This extracts from the file a number of predetermined identification data, examines the file to recognize the page description language (PDL) used and passes these identification data and PDL to control unit 18. In this example, the extracted identification data contain the name of the owner and the name of the file itself. The file is then stored unchanged on memory disc 223, after which the apparatus passes into the stand-by condition.

Control unit 18 manages a list containing the identification data of all the data files for printing stored on memory disc 223. If a new file is supplied via the network, the control unit 18 adds the identification data thereof to the list. Whenever a data file is printed, the control unit 18 removes the identification data of that file from the list.

If an operator wishes to print a specific data file, then he should give an order for this purpose by means of the apparatus operating panel 19A. In response to this, the data file is brought up from the memory disc 223 and converted by the PDL interpreter 224 into printable data which are then processed by the printing unit to give a print.

It would also be possible to construct the apparatus so that data files supplied are immediately converted into printable data and are then stored in memory 111. The above list then contains the data of the supplied and converted files. The operator can then select a file from the list and have it printed, in the same way as in the embodiment described above. The operation of the said functions of the apparatus will now be described.

Operation of Enlargement Function

Reference will be first be made to FIG. 6 in connection with the operation of the enlargement function. The enlargement is adjustable in the "Basic settings" column, which is selected with key 65A.

The column allocated to enlargement is the furthest on the right, above key 65E. This column offers an option between two settings, a first in which the enlargement factor is determined automatically by reference to the format of the original document and the copy format selected, and a second in which the enlargement factor is freely adjustable by the operator. The black dot 80 indicates that the latter option has been selected.

When the latter option is selected, a frame 81 appears around the enlargement factor on the screen, with the star symbol 82 therein, thus showing the operator that the star keys 66A–D are now active for setting the enlargement factor. By way of example, "100%" has been taken as the basic value for the enlargement factor, but another default value can be selected. If, for example, the automatic enlargement has been set prior to the selection of the freely adjustable enlargement factor, then this automatic enlargement factor could also be taken as the basic value.

The operator can now change the value of the enlargement factor in two ways using the key star cluster 66A–D. By means of the pair of keys 66A/B the value is increased or reduced by one percentage point at a time, while the pair of keys 66C/D is used to progress through a set of standard values. These standard values agree with the proportions between the standard paper formats. Standard values of this kind are, for example, for A-formats: 25%, 50%, 71%, 100%, 141%, 200% and 400%.

Figure 9:
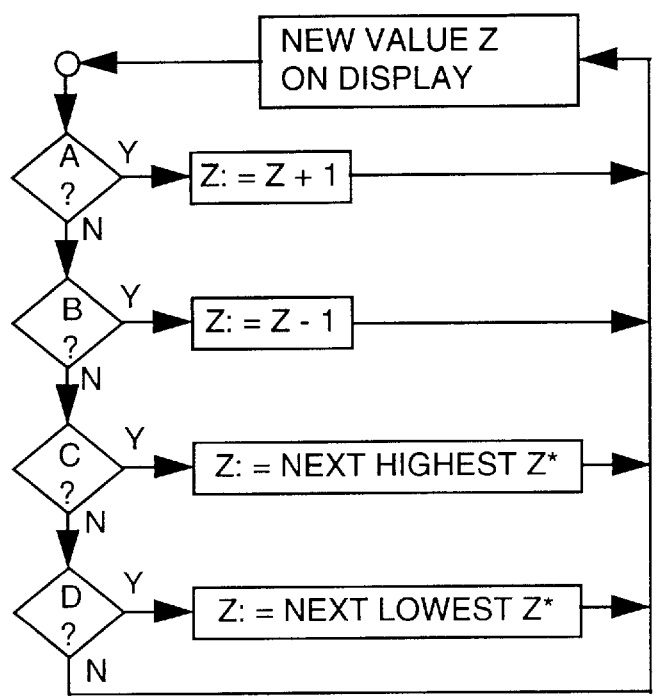
FIG. 9 shows a flow diagram for establishing the enlargement factor set by the operator.

FIG. 9 is a flow diagram traversed by the operating unit in establishing the enlargement factor set by the operator. Here the enlargement factor (expressed as a percentage) is indicated by symbol Z. The standard values are indicated by Z*.

The keys 66A, B, C and D are read out continuously in a cycle with short intervals. If an activated key is found in these circumstances, the valid value of the enlargement factor Z at that time is changed in dependence on the function of that key.

If key 66A is activated, the enlargement factor is increased by one percentage point, while if key 66B is activated, the enlargement factor is reduced by one percentage point. If key 66C is activated, the enlargement factor is made equal to the next highest standard value while if key 66D is activated the enlargement factor is made equal to the next lowest standard value.

Although not shown in the drawing, when a maximum value is reached in either value series, the value is not changed any more, but remains at the current value. If the operator keeps a key depressed, the enlargement factor will automatically be increased or reduced further with a certain cycle time until the maximum or minimum value is reached.

After the enlargement factor has changed in value, the new value is shown on the display and this value is passed to the apparatus control which reprograms the ZOOM module and, if applicable, the control of the scanner motor 9, so that the correct change in the resolution of the image data is obtained.

Operation of Multiple-Up Function

Figure 10:
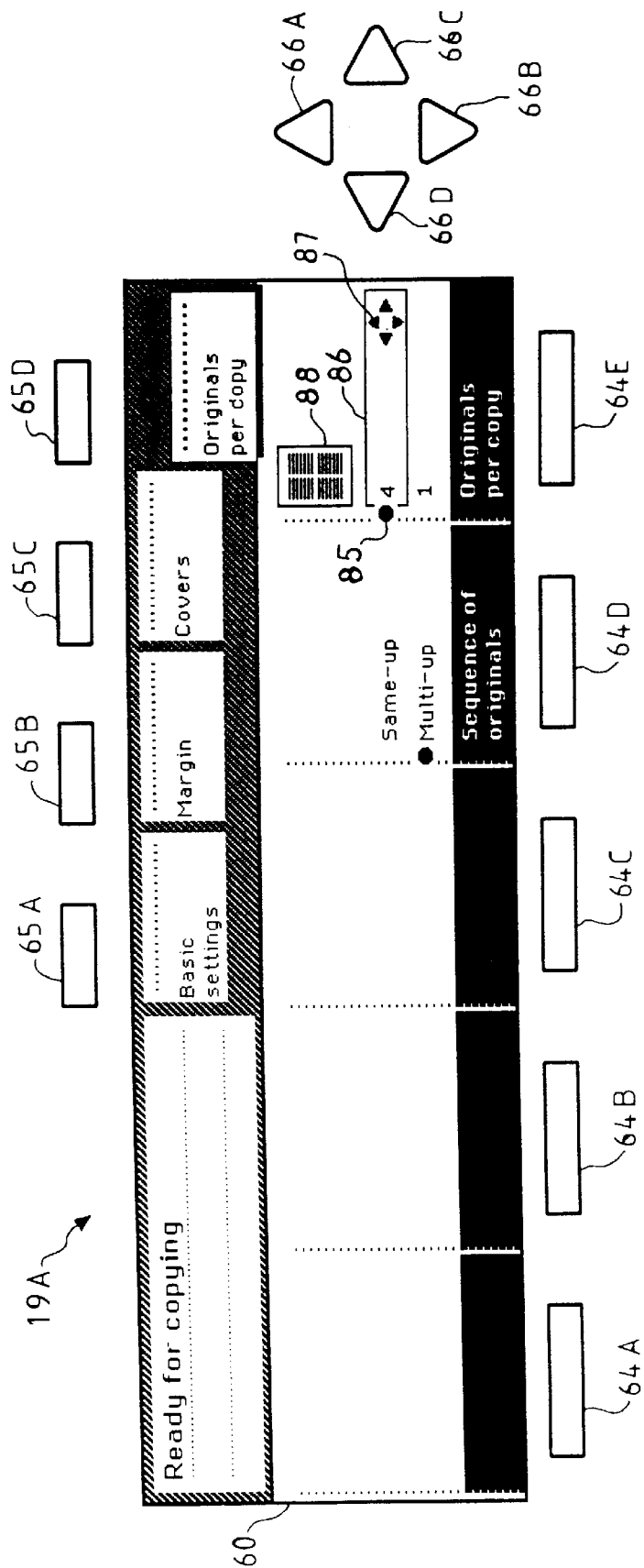
FIG. 10 shows the make-up of the display screen on the operating panel.

The multiple-up function is selected by depressing key 65D and selecting the multiple-up function with key 64E. FIG. 10 shows the make-up of the display screen after this has been done and a number of four originals per copy has been set.

In the furthest right column of the display screen 60 the dot 85 and the frame 86 now indicate that the multiple-up function has been set and the value "4" shows that the 4-up setting has been selected therein. An icon 88 diagrammatically shows the layout of any print: a copy sheet with four rectangles representing the sub-images thereon. Finally, the frame 86 includes the star symbol 87 to show the operator that the star cluster keys 66A–D are now active for setting the number of sub-images to be reproduced on a copy sheet.

Key 64D can also be used to select whether the sub-images are each to represent a different original ("multi-up") or all the same original ("same-up"). Here the "multi-up" setting has been selected.

The star keys 66A–D can now be used to set the number of sub-images per copy sheet.

The number is increased or reduced simultaneously by one using the pair of keys 66A/B while the pair of keys 66C/D is used to progress through a set of standard values. These standard values agree with the squares (corresponding to a lay-out of n×n sub-images wherein the total image has the same orientation as the sub-images) and also the squares multiplied by 2 (corresponding to a layout with two blocks each of n×n sub-images next to one another, the total image being rotated through 90° with respect to the orientation of the sub-images). The standard value series thus consists of the values: 2, 4, 8, 9, 16, 18, 25, 32, etc.

It should be noted that during the printing the sub-images are always disposed in a lay-out agreeing with one of the standard values. One or more spaces may possibly not be filled if the number of sub-images set does not belong to the standard values. It is up to the operator exactly to indicate the number of sub-images (using the pair of keys 66A/B), or immediately select the required layout, the latter by selecting the associated standard value (using the pair of keys 66C/D).

Figure 11:
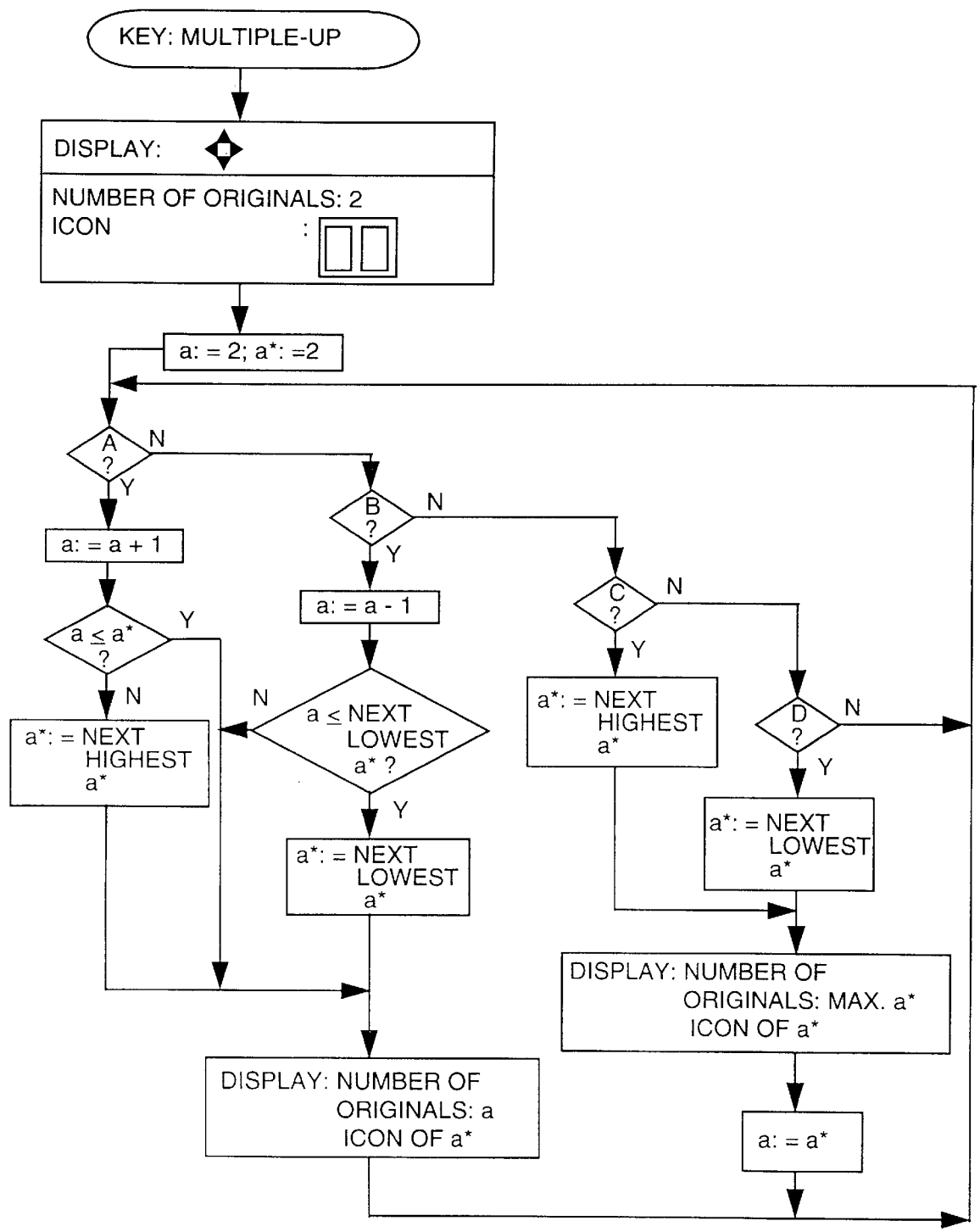
FIG. 11 is a flow diagram for establishing a multiple-up mode set by the operator.

FIG. 11 shows a flow diagram traversed by the operating unit in establishing the number of sub-images set by the operator. The exact number (expressed in units) is indicated here by the symbol a. The standard values are indicated by a*.

On selection of the multiple-up function with key 64E, the frame 86 with the star symbol 87 and the icon 86 are placed in the column thereabove. The default value taken is "2".

The keys 66A, B, C and D are read out continuously in a cycle with short intervals. If an activated key is found in these circumstances, the valid value of the number of sub-images at that time is changed in dependence on the function of that key.

If key 66A is activated, the number of sub-images a is increased by 1, and then a check is made whether the new number still fits in the current standard value a*. If not, a* is increased to the next (highest) standard value. For example, if a is increased from 2 to 3 (a* was 2 for a=2) then a* must be increased to 4, because 3 sub-images do not fit in a 2×1 layout although they do in a 2×2 layout. The new number a is then displayed on the display screen together with the icon corresponding to the possible new value of a*. The program then returns to the read-out cycle of the star keys.

If key 66A is not activated but key 66B is activated, then the number of sub-images a is reduced by 1. A check is then made whether the new number also fits in the standard number directly below the current standard number a*. If so, this lower value is selected for a*. The new number a is then displayed on the screen together with the icon corresponding to the possible new value of a*. The program then returns to the read-out cycle of the star keys.

If key 66C is activated, the next highest value of the series is taken for a* and if key 66D is activated the next lowest value of the series is taken for a*. In both cases, the number of sub-images displayed on screen 60 in the column above key 64E is "max.", followed by the instantaneous value of a*, and also the icon corresponding to a*. Finally, the value of a is made equal to a* and the program returns to the read-out cycle of the star keys. It should be noted that the actual number of documents to be printed may be greater than the standard number a* set. In that case, more copy sheets are used, each with a layout according to a*.

Figure 13:
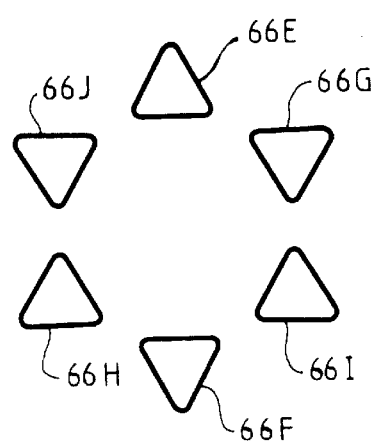
FIG. 13 shows an alternative key star cluster.

In an alternative embodiment, the key star is formed by six keys 66E–J as shown in FIG. 13. As already stated, the series of standard numbers of sub-images consists of the squares and the squares multiplied by two. In the first case, the orientation of the copy sheet is equal to that of the sub-images while in the second case it is not. In this embodiment, the series of squares is adjustable with the pair of keys 66G–H and the series of squares multiplied by two is adjustable with the pair of keys 66I–J. Thus the operator can select the orientation of the copy sheet by using one or other of the said pairs of keys. The exact number of sub-images is always set with the pair of keys 66E–F.

Implementation of the operation is completely similar to the above description relating to the four-key star.

Figure 12:
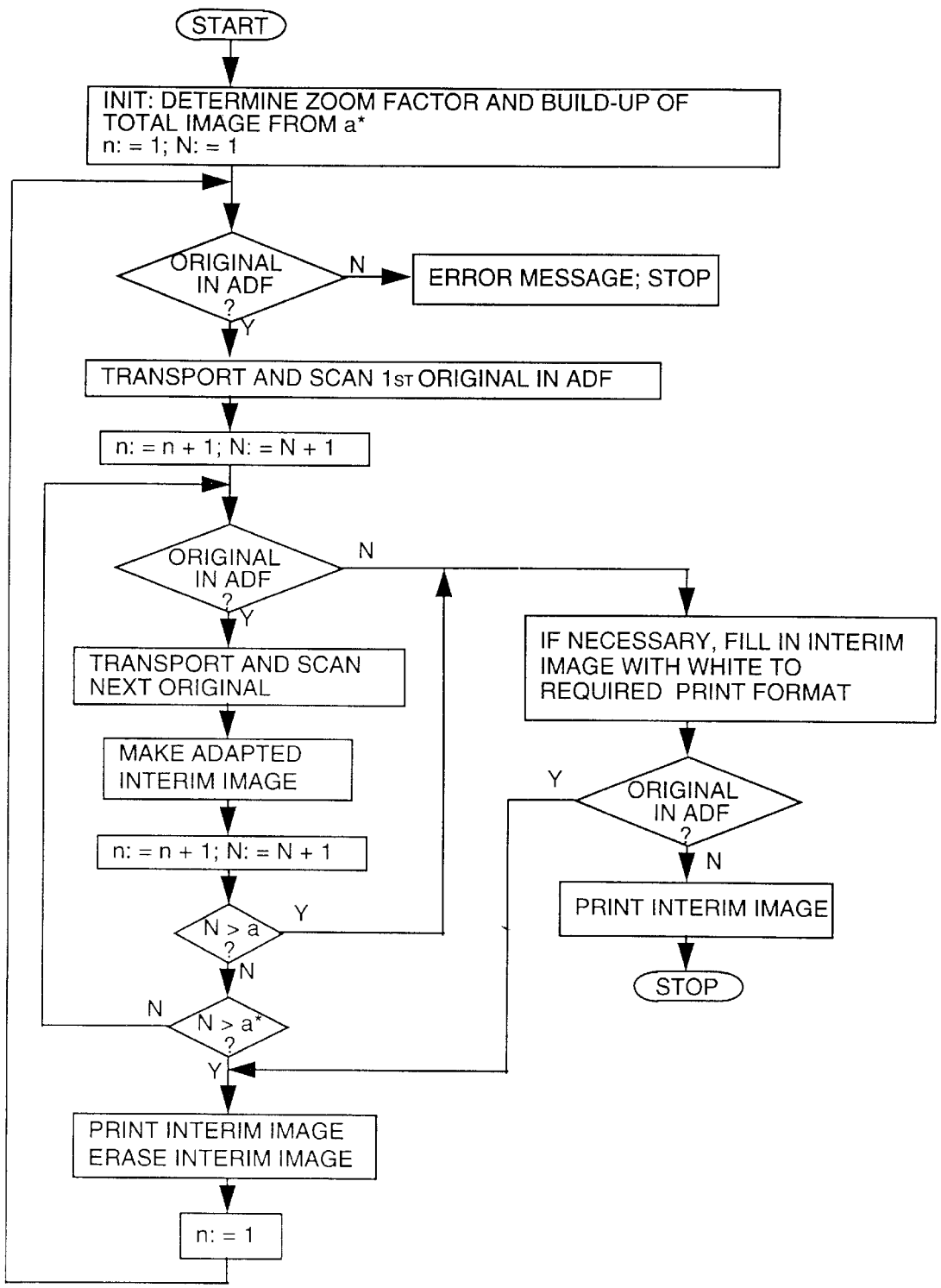
FIG. 12 is a flow diagram for executing a multiple-up order.

FIG. 12 shows a flow diagram traversed by the apparatus control in implementing a multiple-up order. This is started by the operator depressing start key 61 after the settings of the multiple-up mode and the number of sub-images per copy have been made.

Starting with the value of a*, the necessary data for the reduction and the layout of the sub-images is brought up from a table.

A sensor suitable for the purpose now checks whether the feed tray of the ADF contains original documents; if not, a message is transmitted and the apparatus stops.

The first document is then conveyed to the scanner and scanned (in reduced form), followed by the following documents, as long as there are documents in the ADF feed tray. An interim image is formed for each subsequent document, consisting of images of all the documents scanned till then. The latter has been described in detail with reference to FIG. 8.

A counter N updates the number of documents already processed. When the total number of documents a input by the operator with the pair of keys 66A/B has been reached, then (only if the actual number of documents is smaller than the current standard number a*) the interim image is filled in with blank sub-images until the standard number a* and a print is made of the interim image. Also, if the number of documents in the ADF feed tray is less than the number a, a print is made with possibly blank spaces.

If the actual number of documents is found to be greater than the number a input by the operator, or if it is greater than the standard number a* set, the-full-interim image is printed and a fresh start is made with the remaining documents. A counter n now updates the number of processed documents in the new interim image.

Operation of Print Function

Figure 14:
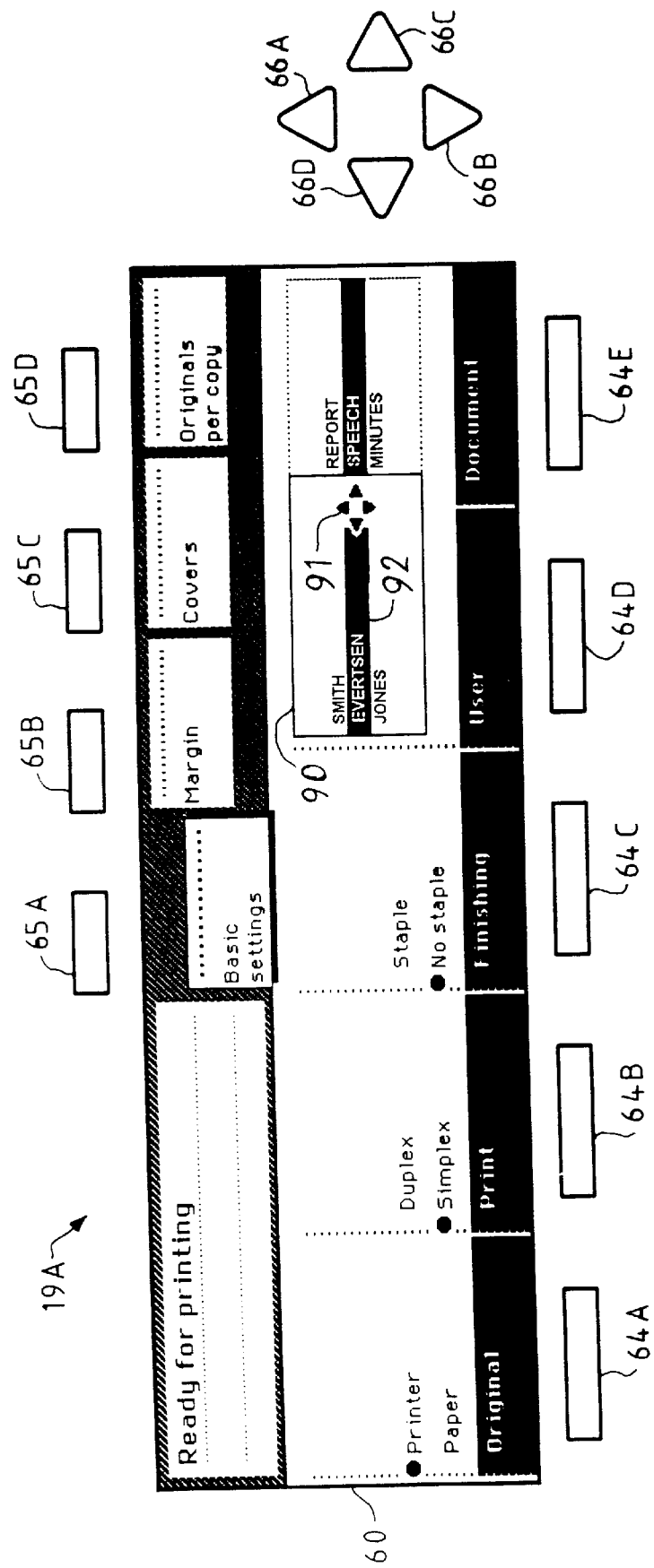
FIG. 14 shows the make-up of a display screen.

FIG. 14 shows the make-up of the display screen 60 after the print function has been selected with key 64A in the basic settings column. In this case the function of key 64B changes to the extent that only "single or double sided" can now be set with respect to the print. The keys 64D and 64E now also receive the function of specifying the data file for printing by selecting the user and file name. Different files of different users may be stored in the memory. All these files are written in a list of the control unit 18, as described hereinbefore, and can be displayed on the screen 60 for selection.

After key 64D has been depressed, an operator can select a user name from the list of users who have sent one or more files, and after depression of key 64E a file name can be selected from the list of files sent by the selected user. When the print function has been selected with key 64A, the apparatus also automatically comes into the same mode as after depression of key 64D. In that case this latter key does not have to be repressed.

The file thus selected is printed on depression of the start key 61.

In response to the depression of key 64D (or 64A), the column of the screen above this key is provided with a frame 90 and a star symbol 91 to indicate that a user name can be selected and that the star keys 66A–D are active for such selection. As a pre-selection, the name is automatically selected of the user who last sent a file to the apparatus. As an alternative, of course, it would be possible to use the first user name in alphabetical order or any other preference. The key pair 66A/B is used to progress in alphabetical order through all the user names in the list, key 66A for forward and key 66B for backward progress. If there are more names than can be displayed simultaneously in frame 90, then as many names as fit therein are displayed and the display scrolls automatically through the entire list. A bar 92 with text in reverse video shows what name has been selected. The pair of keys 66C/D is used to jump to the first name in the list starting with the next or previous letter in the alphabet. For example, if the list contains the names: "aavm", "adf", "aghh", "bcd", "bhg", "evl", "joe", "kgh", then starting from the selection "bcd", after depression of key 66A the program jumps to "bhg" and after depression of key 66B to "aghh", after depression of key 66C to "evl" and after depression of key 66D to "aavm". The implementation of this procedure is obvious and similar to the above-described examples. Here again, if a key is kept depressed then following steps are automatically made each time.

In response to depression of key 64E, the column of the screen above that key is provided with a frame and a star symbol just as in the case of depression of key 64D as described above, to show that a file name can be selected and that the start keys 66A–D are active for that selection. The selection with the star keys is exactly the same as that for the selection of a user name. The last file sent is chosen, for example, as pre-selection.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An interface in an apparatus for reproducing images, the interface enabling selection of a value for a parameter from among one of a plurality of subsets to a set of all possible values of the parameter, the parameter defining at least in part how at least one image is to be reproduced, the interface comprising:

manipulation means, physically configured to be manipulable in ways corresponding to a plurality of intersecting lines, respectively, for converting manipulation into a signal that indentifies one of two possible directions of a line;

a memory for storing said plurality of subsets to said set of all possible values for said parameter, each subset corresponding to one of the lines; and parameter-value means, operatively interconnected to the manipulation means and the memory, for enabling selection of a value within one of said subsets to said set of possible value of the parameter in response to the way in which the manipulation means is manipulated along one of said plurality of intersecting lines independent of manipulation along other ones of said plurality of intersecting lines, as indicated by the signal from said manipulation means.

2. An interface as in claim 1, wherein:
   the manipulation means is a cursor key set.

3. An interface as in claim 1, wherein:
   the manipulation means is a joystick.

4. An interface as in claim 1, wherein:
   the manipulation means is a trackball.

5. An interface as in claim 1, wherein:
   the manipulation means is a mouse.

6. An interface as in claim 1, wherein:
   if the manipulation means is manipulated in a way corresponding to the first of the two directions of a line, then the parameter-value means enables stepwise selection from among the values in the corresponding subset according to a predetermined sequence; and wherein, if the manipulation means is manipulated in a way corresponding to the second of the two directions of a line, then the parameter-value means enables stepwise selection from among the values in the corresponding subset according to the reverse of the predetermined sequence.

7. An interface as in claim 6, wherein:
   the manipulation means is a star-shaped configuration of an even number N of touchpoints, $N \geq 4$;

wherein there are ½N lines; and wherein each direction of each lines has a touchpoint assigned thereto, such that the parameter-value means responds to a touchpoint assigned to the first direction of a line by enabling stepwise selection of the values in the corresponding subset according to the predetermined sequence, and such that the parameter-value means responds to a touchpoint assigned to the second direction of a line by enabling stepwise selection of the values in the corresponding subset according to the reverse of the predetermined sequence.

8. An interface as in claim 7, wherein:
a touchpoint is physically configured to indicate the direction to which it is assigned.

9. An interface as in claim 7, wherein:
the manipulation means has either two lines or three lines.

10. An interface as in claim 7, wherein:
the touchpoints of the manipulation means are located in close proximity to one another.

11. An interface as in claim 7, wherein:
the touchpoints are discrete switches.

12. An interface as in claim 7, wherein:
the touchpoints are discrete areas on a touch screen.

13. An interface as in claim 1, wherein:
the plurality of subsets for a predetermined value includes:
a first subset that is all possible values of the parameter; and
a second subset that is also a subset of the first set, each value within the second subset being a preferred value of the parameter.

14. An interface as in claim 13, wherein:
the apparatus changes an image by enlarging or reducing according to a change factor;
wherein the predetermined parameter is the change factor;
wherein the first subset is of all possible change factors; and
wherein the second subset is of preferred change factors.

15. An interface as in claim 14, wherein:
the second subset is of change factors that convert an original document image on a first standard size sheet of paper to a different second standard size.

16. An interface as in claim 13, further comprising:
multiple-up means for generating a multiple-up image from a plurality of original document images according to a multiple-up factor,
a multiple-up image having a plurality of sub-images corresponding to original document images;
wherein said parameter is the multiple-up factor;
wherein the first subset is of the total number T in the plurality of original document images; and
wherein each member of the second subset is a number of equally-sized sub-images that can fill a copy sheet that is to receive the multiple-up image.

17. An interface as in claim 16, wherein:
the second subset is $\{J^2, 2*K^2\}$, where J is a whole number such that $J^2 \leq T$, and where K is a whole number such that $2*K^2 \leq T$.

18. An interface as in claim 16, wherein:
the second subset is $\{J^2\}$, where J is a whole number such that $J^2 \leq T$; and
wherein a third subset is $\{2*K^2\}$, where K is a whole number such that $2*K^2 \leq T$.

19. An interface as in claim 1, further comprising:
parameter choosing means for enabling selection of said parameter from a plurality of parameters.

20. An interface as in claim 19, wherein:
the parameter-value means responds to the parameter choosing means by controlling display of a star-shaped icon to indicate that the manipulation means should be manipulated.

21. An interface as in claim 13, wherein:
the apparatus stores, in memory, a plurality of files corresponding to images that are to be reproduced;
wherein each file is identified by an identity code, the identity code being a character string;
wherein said parameter is the identity code of the file that is to be reproduced;
wherein the first subset is of all the identity codes; and
wherein the second subset is a subset of all the identity codes.

22. An interface as in claim 21, wherein:
the second subset includes, for each alphanumeric character represented in the first subset, the alphabetically-first or numerically-first character strings starting with the same character.

23. An apparatus for reproducing images, the apparatus having an interface enabling selection of a value for a parameter from among one of a plurality of subsets to a set of all possible values of the parameter, the parameter defining at least in part how at least one image is to be reproduced, the apparatus comprising:
image generation means for generating at least one image;
a printer;
an interface enabling selection of a value for a parameter from among a predetermined set of possible values of the parameter; and
a controller for coordinating and controlling the image generation means, the printer, and the interface;
wherein the interface includes:
manipulation means, physically configured to be manipulable in ways corresponding to a plurality of intersecting lines, respectively, for converting manipulation into a signal that identifies one of two possible directions of a line;
a memory for storing said plurality of subsets to said set of all possible values for said parameter, each subset corresponding to one of the lines; and
parameter-value means, operatively interconnected to the manipulation means and the memory, for enabling selection of a value within one of said subsets of possible values of the parameter in response to the way in which the manipulation means is manipulated along one of said plurality of intersecting lines independent of manipulation along other ones of said plurality of intersecting lines, as indicated by the signal from said manipulation means.

24. An apparatus as in claim 23, further comprising:
image generating means for generating at least one image to which a parameter is relevant.

25. An apparatus as in claim 23, wherein: the image generating means includes at least one of:
an optical imaging system; and
an electro-optical scanner.

26. An apparatus as in claim 23, wherein:
if the manipulation means is manipulated in a way corresponding to the first of the two directions of a line, then the parameter-value means enables stepwise selection from among the values in the corresponding set according to a predetermined sequence; and wherein, if the manipulation means is manipulated in a way corresponding to the second of the two directions of a line, then the parameter-value means enables stepwise selection from among the values in the corresponding set according to the reverse of the predetermined sequence.

27. An apparatus as in claim 26, wherein:

the manipulation means is a star-shaped configuration of an even number N of touchpoints, $N \geq 4$;

wherein there are ½N lines; and wherein each direction of each line has a touchpoint assigned thereto, such that the parameter-value means responds to a touchpoint assigned to the first direction of a line by enabling stepwise selection of the values in the corresponding set according to the predetermined sequence, and such that the parameter-value means responds to a touchpoint assigned to the second direction of a line by enabling stepwise selection of the values in the corresponding set according to the reverse of the predetermined sequence.

28. An apparatus interface as in claim 23, wherein:

the plurality of subsets for said parameter includes:

a first subset that is all possible values of the parameter; and a second subset that is also a subset of the first subset, each value within the second set being a preferred value of the parameter.

29. An apparatus interface as in claim 28, wherein:

the apparatus changes an image by enlarging or reducing according to a change factor;

wherein the parameter is the change factor;

wherein the first subset is of all possible change factors; and wherein the second subset is of preferred change factors.

30. An apparatus interface as in claim 29, wherein:

the second subset is of change factors that convert an original document image on a first standard size sheet of paper to a different second standard size.

31. An apparatus interface as in claim 28, further comprising:

multiple-up means for generating a multiple-up image from a plurality of original document images according to a multiple-up factor, a multiple-up image having a plurality of sub-images corresponding to original document images;

wherein said parameter is the multiple-up factor;

wherein the first subset is of the total number T in the plurality of original document images; and wherein each member of the second subset is a number of equally-sized sub-images that can fill a copy sheet that is to receive the multiple-up image.

32. An interface as in claim 28, wherein:

the apparatus stores, in memory, a plurality of files corresponding to images that are to be reproduced;

wherein each file is identified by an identify code, the identity code being a character string;

wherein said parameter is the identity code of the file that is to be reproduced;

wherein the first subset is of all the identity codes; and wherein the second subset is also a subset of all the identity codes.

33. An interface as shown in claim 1, wherein said plurality of intersecting lines includes at least three lines each of which intersect in a common point.

34. A An apparatus as shown in claim 23, wherein said plurality of intersecting lines includes at least three lines each of which intersect in a common point.

35. An interface as shown in claim 1, wherein said subsets are non-disjoint.

36. An apparatus as shown in claim 23, wherein said subsets are non-disjoint.

37. An interface as shown in claim 1, wherein said interface is operable to enable selection of values for a plurality of parameters, respectively.

38. An apparatus as shown in claim 23, wherein said interface is operable to enable selection of values for a plurality of parameters, respectively.

* * * * *